Aug. 15, 1961 H. HECKSCHER 2,996,617
DEVICE TO VIEW A PHOTOGRAPHIC NEGATIVE AS A POSITIVE IMAGE
Filed Aug. 11, 1958
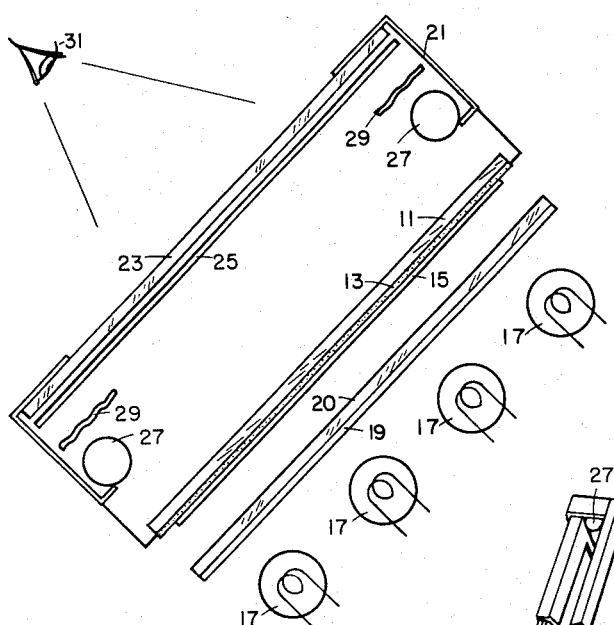
FIG. 1
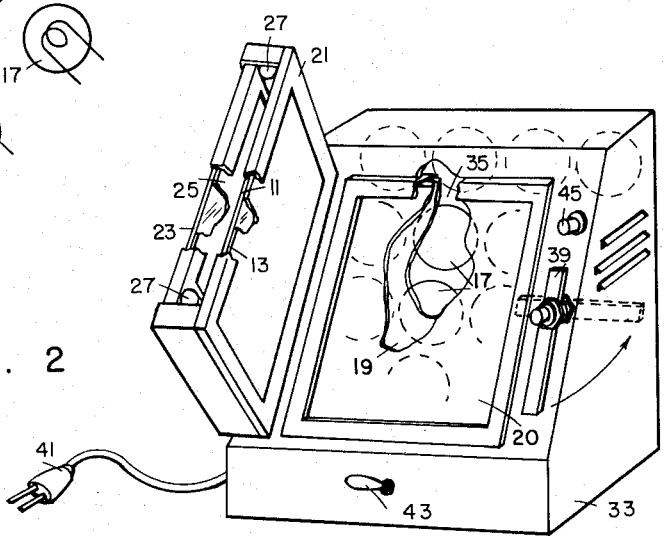
FIG. 2
FIG. 3
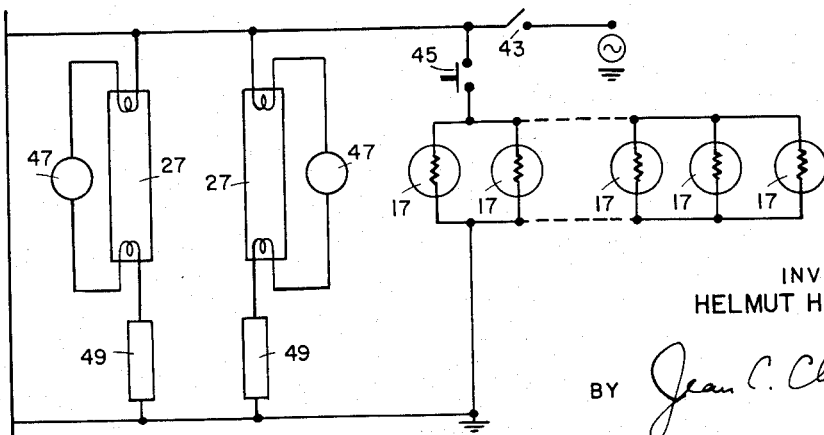
INVENTOR
HELMUT HECKSCHER
BY Jean C. Chognard
ATTORNEY United States Patent Office 2,996,617
Patented Aug. 15, 1961

2,996,617
DEVICE TO VIEW A PHOTOGRAPHIC NEGATIVE AS A POSITIVE IMAGE
Helmut Heckscher, 48 Mount Vernon St., Cambridge, Mass., assignor of one-half to Jean C. Chognard, Menlo Park, Calif.
Filed Aug. 11, 1958, Ser. No. 754,494
7 Claims. (Cl. 250—71)

This is a continuation-in-part of my application Serial No. 685,020, filed September 19, 1957, now abandoned.

Photographic negatives from black and white film show a picture in which the light areas of the scene which was photographed appear dark and vice versa. This makes it difficult for an observer to judge accurately the quality of the negative without printing a positive. Printing the negative only to reject it later on is both expensive and time consuming.

A device to view photographic negatives as positive images has been proposed in the past. This device comprises a transparent plate of glass or quartz coated with an infrared quenching phosphor. The negative is placed against the coated back of the plate. The phosphor coating is selectively quenched through the transparent portions of the negative by infrared radiation coming from one or more infrared lamps placed behind the plate. An ultraviolet lamp in front of the plate excites the unquenched portion of the phosphor coating, thus yielding a positive image.

One drawback of this proposed device is that it produces positive images that do not satisfactorily show some of the finer details contained in the negative. Some of the infrared radiation that goes through the light areas of the negative and through the phosphor is totally or partially reflected by the surface of the glass remote from the phosphor. This reflection, which occurs inside the glass or quartz plate, causes infrared radiation to bounce back onto the phosphor in adjacent areas and to cause quenching where quenching should not occur. Also some of the visible light emitted by a phosphor particle is totally or partially reflected by the surface of the glass remote from the phosphor. This light bounces back onto adjacent phosphor particles making them appear lighter than they should. The combination of these two effects makes it impossible to see in the positive image some of the finer details contained in the negative.

It is the principal object of this invention to improve the quality of the positive images obtained in devices to view photographic negatives as positive images.

In accordance with the illustrated embodiment of this invention this improved resolution is obtained by coating the infrared quenching phosphor on a very thin base, preferably made of plastic material, the thickness of the base being of the order of one-thousandth of an inch (one mil) or less.

Other and incidental objects of this invention will be apparent to those skilled in the art from a reading of this specification and an inspection of the accompanying drawing in which:

FIGURE 1 is a schematic diagram illustrating the principles of operation of an embodiment of the present invention, FIGURE 2 is a view in perspective of a viewer in accordance with this invention, and FIGURE 3 is an electrical circuit diagram showing the electrical connections of the viewer of FIGURE 2.

Reference is now made to FIGURE 1 which shows a transparent base 11 on one side of which is a coating 13 of infrared-quenching phosphor. The base 11 may be for instance a Saran film (The Dow Chemical Co.) which is commercially available and has a thickness of about 1.0 mil. The base 11 is preferably glued to a metal frame, using Epon resin for instance, to give it rigidity. Saran film seems to be particularly suitable because humidity and even moisture have no effect on it so that it does not sag or wrinkle once it has been attached to the frame. The phosphor can be deposited onto this screen by dispersing it in water and letting it settle. The liquid is then siphoned off and the screen allowed to dry. The addition of a few drops of a dispersing agent, such as Daxad 30 (Dewey & Almy Corp.) aids in the dispersion of the phosphor. The addition of a wetting agent such as Alrowet D–65 (Geigy Industrial Chemicals) is also helpful to obtain a good screen. The phosphor can be fixed to the screen by spraying it with clear Krylon. The negative 15 which is to be viewed as a positive image may be positioned against the coating 13. The coating 13 is selectively subjected through the transparent portions of the negative 15 to infrared energy coming from a bank of incandescent infrared lamps 17 and filtered through a red filter 19 protected by a transparent glass plate 20. On the other side of the base 11 is a frame 21 holding a transparent glass plate 23, a green filter 25, and a pair of ultraviolet fluorescent lamps 27. Two strips of foil 29 may be used to reflect the ultraviolet radiation coming from lamps 27 onto the base 11.

The principles of operation of the viewer shown schematically in FIGURE 1 will now be explained. I have said that the coating 13 was a coating of an infrared-quenching phosphor. Phosphors are normally excited (i.e. they light up) when ultraviolet radiation impinges upon them. An infrared-quenching phosphor is one that is quenched by infrared radiation. In other words, if we take an infrared-quenching phosphor and subject it to infrared radiation, it will be quenched so that it will not light up if we subject it at the same time to ultraviolet radiation. Let us now focus our attention to a light area of the negative 15. Since this is light it will permit infrared radiation coming from infrared lamps 17 to impinge upon the part of the coating 13 immediately beneath that light area of the negative. That portion of the coating 13 will therefore be quenched so that it will not be excited by ultraviolet radiation coming from the ultraviolet lamps 27. It will therefore appear dark. Let us now direct our attention to a dark area of the negative 15. This dark area will prevent infrared radiation from the infrared lamps 17 from impinging upon that portion of the coating 13 immediately beneath that dark area. That portion of the coating 13 will not be quenched and will therefore be excited by ultraviolet radiation coming from the ultraviolet lamps 27 and will therefore appear light. Similarly those portions of the negative which are grey will let some infrared radiation coming from the lamps 17 impinge upon that portion of the coating 13 immediately beneath the grey area, and those portions of the coating 13 will be partially quenched. The darker the grey the less quenched will be the portion of the negative directly beneath it. Thus an observer 31 will see an image on the plate 11 in which the light areas of the negative will appear dark and the dark areas of the negative will appear light. In other words, the observer 31 will see a positive image.

The image quality obtained with a screen comprising a base having a thickness of the order of one-thousandth of an inch or less and a coating of infrared-quenching phosphor thereon is much greater than that obtained with the thicker plates of the prior art. With the negative 15 positioned against the coated side of the base 11, as shown in the drawing, internal reflections still occur, but the infrared radiation which is reflected inside the very thin base lands on the phosphor very much closer to its point of entry. There is therefore no widely scattered quenching due to internal reflection. The reflected visible light emitted by the phosphor is similarly contained. Also, because of its extreme thinness, the screen may be turned around and the negative placed against the side of the base 11 remote from the coating 13. This avoids the possibility of having the phosphor surface injure the negative.

Reference is now made to FIGURE 2 which shows a device in accordance with the invention comprising a box 33 having an opening 35 in one face thereof. The opening 33 is covered by the red filter 19 which is protected by the transparent glass plate 20. The frame 21 is hinged on the face of the box 33 having the opening 35. The frame 21 supports the transparent plastic base 11 with its coating 13, the transparent glass plate 28, the green filter 25 and the ultraviolet fluorescent lamps 27. To operate the viewer, a photographic negative is placed over the transparent glass plate 20, the frame 21 is rotated about its hinges and placed over the negative and held in place by means of the locking device 39. The device is connected to a source of power by means of the electric cord 41. The box 33 is provided with an on-off switch 43. When the switch 43 is on, ultraviolet lamps 27 light up. In order to see the negative the push-button switch 45 is actuated and this switch energizes the infrared lamps 17. A positive image of the negative is seen on the transparent plastic base 11.

The electrical wiring diagram of the device of FIGURE 2 is shown in FIGURE 3. The connection from the power supply goes through the switch 43 to the ultraviolet lamps 27 which are shown connected in a conventional manner with their starters 47 and ballast resistances 49. The connection from the power supply also goes through the on-off switch 43 and through push-button switch 45 to the bank of incandescent infrared lamps 17 which are connected in parallel.

In a successful embodiment of the invention the infrared-quenching phosphor was Phosphor #3210 supplied by the U.S. Radium Corporation, the sixteen infrared lamps 17 were fifteen-watt clear glass incandescent lamps, the ultraviolet lamps 27 were four-watt Black Lite fluorescent lamps manufactured by Sylvania Electric Products Incorporated, the red filter 19 was a Kodak Wratten 89B, and the green filter 25 was a Kodak Wratten 57 filter. When the filter 19 is a gelatin filter it is desirable to shield it from the heat generated by the infrared lamps 17 by interposing a glass plate (not shown) between the filter 19 and the infrared lamps 17.

The color of the filter 25, which is green in the illustrated embodiment of the invention, should correspond to that of the coating 13 when it is excited. The green filter 25 prevents ultraviolet radiation from lamps 27 and red radiation from lamps 17 from reaching the eye, and cuts down the amount of ambient light which would otherwise reach the coating 13 and tend to "wash out" the black areas of the picture.

I claim:

1. A device to view a photographic negative as a positive image, said device comprising a transparent base having a thickness not greater than one mil, a coating of infrared-quenching phosphor on said base, an infrared lamp on one side of said base, means to project ultraviolet radiation onto the opposite side of said base, and means to position said negative between said coating and said infrared lamp.

2. A device to view a photographic negative as a positive image, said device comprising a transparent base having a thickness not greater than one mil, a coating of infrared-quenching phosphor on said base, an infrared lamp on one side of said base, a red filter interposed between said infrared lamp and said base, means to project ultraviolet radiation onto the opposite side of said base, and means to position said negative between said coating and said infrared lamp.

3. A device to view a photographic negative as a positive image, said device comprising a transparent base having a thickness not greater than one mil, a coating of infrared-quenching phosphor on said base, an infrared lamp on one side of said base, means to project ultraviolet radiation onto the opposite side of said base, a green filter on said opposite side of said base, and means to position said negative between said coating and said infrared lamp.

4. A device to view a photographic negative as a positive image, said device comprising a transparent base having a thickness not greater than one mil, a coating of infrared-quenching phosphor on said base, an infrared lamp on one side of said base, a red filter interposed between said infrared lamp and said base, means to project ultraviolet radiation onto the opposite side of said base, a green filter on said opposite side of said base, and means to position said negative between said coating and said infrared lamp.

5. A device to view a photographic negative as a positive image, said device comprising a transparent base having a thickness not greater than one mil, a coating of infrared-quenching phosphor on said base, said phosphor emitting light of a given color when excited, an infrared lamp on one side of said base, means to project ultraviolet radiation onto the opposite side of said base, a filter of said given color on said opposite side of said base, and means to position said negative between said coating and said infrared lamp.

6. In a device to view a photographic negative as a positive image, a screen comprising a base having a thickness not greater than one mil, and a coating of infrared-quenching phosphor on said base.

7. In a device to view a photographic negative as a positive image, a screen comprising a plastic base having a thickness not greater than one mil and a coating of infrared-quenching phosphor on said base.

References Cited in the file of this patent

UNITED STATES PATENTS

| | | |
|---|---|---|
| 2,481,770 | Nadeau | Sept. 13, 1949 |
| 2,521,953 | Tuttle | Sept. 12, 1950 |
| 2,549,860 | Swanson | Apr. 24, 1951 |
| 2,599,739 | Barnes | June 10, 1952 |
| 2,705,758 | Kaprelian | Apr. 5, 1955 |
| 2,734,142 | Barnes | Feb. 7, 1956 |

FOREIGN PATENTS

| | | |
|---|---|---|
| 461,938 | Italy | Feb. 20, 1951 |
| 1,002,056 | France | Mar. 3, 1952 |
| 879,325 | Germany | June 11, 1953 |